United States Patent
Lynch et al.

(10) Patent No.: US 6,643,440 B2
(45) Date of Patent: Nov. 4, 2003

(54) TEMPERATURE RANGE ADJUSTED COATED OPTICAL FIBERS

(75) Inventors: Thomas Martin Lynch, Woodbury, MN (US); Brian Kenneth Nelson, Shoreview, MN (US); James Craig Novack, Hudson, WI (US); James Robert Onstott, Dresser, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/251,462

(22) Filed: Sep. 20, 2002

(65) Prior Publication Data

US 2003/0026988 A1 Feb. 6, 2003

Related U.S. Application Data

(63) Continuation of application No. 09/780,983, filed on Feb. 9, 2001.

(51) Int. Cl.[7] .............................. G02B 6/02; G02B 6/22
(52) U.S. Cl. ........................ 385/128; 65/443; 65/484; 356/73.1
(58) Field of Search .......................... 385/128; 65/443, 65/484; 356/73.1

(56) References Cited

U.S. PATENT DOCUMENTS

| | | | | |
|---|---|---|---|---|
| 4,482,204 A | * | 11/1984 | Blyler et al. | 385/141 |
| 4,798,852 A | * | 1/1989 | Zimmerman et al. | 522/96 |
| 5,217,518 A | | 6/1993 | Petisce | |
| 5,219,623 A | | 6/1993 | Petisce | |
| 5,644,670 A | * | 7/1997 | Fukuda et al. | 385/124 |
| 6,222,972 B1 | * | 4/2001 | Yamamoto et al. | 385/127 |
| 6,428,204 B1 | * | 8/2002 | Kuck et al. | 374/45 |

FOREIGN PATENT DOCUMENTS

| | | |
|---|---|---|
| DE | 42 26 344 A1 | 2/1994 |
| EP | 0509487 A2 | 10/1992 |
| EP | 0530715 A1 | 3/1993 |
| EP | 0785959 | 4/1996 |
| EP | 1065182 A2 | 1/2001 |
| FR | 2 629 187 | 9/1989 |
| JP | 63-277539 | 11/1988 |
| JP | 01-183434 | 7/1989 |
| JP | 01-203245 | 8/1989 |
| JP | 01-286941 | 11/1989 |
| JP | 04-037633 | 2/1992 |
| JP | 04-224144 | 8/1992 |
| JP | 04-240136 | 8/1992 |
| JP | 04-240137 | 8/1992 |
| WO | WO 97/37824 | 10/1997 |

OTHER PUBLICATIONS

E. Suhir, "Calculated Stresses in Dual Coated Optical Fibers", *Polymer Engineering and Science* (Jan. 1990), vol. 30, No. 2, pp. 108–117.

C.J. Aloisio, Jr., et al, "A Viscoelastic Analysis of Thermally Induced Residual Stresses in Dual Coated Optical Fibers", *International Wire & Cable Symposium Proceedings* (1995), pp. 139–145.

(List continued on next page.)

*Primary Examiner*—Akm Enayet Ullah
*Assistant Examiner*—Jerry T Rahll
(74) *Attorney, Agent, or Firm*—Nestor F. Ho; Alan Ball; Gregg H. Rosenblatt

(57) ABSTRACT

A coated optical fiber adjusted to operate at a predetermined temperature range. The coated fiber includes an optical fiber, a first polymer coating generally concentrically surrounding the optical fiber and a second polymer coating generally concentrically surrounding the first polymer coating, wherein the first polymer coating includes substantially no coefficient of thermal expansion stresses when the optical fiber is placed at a lower end of the temperature range.

16 Claims, 1 Drawing Sheet

OTHER PUBLICATIONS

Aly, et al, "Microbending Loss and Stresses Induced by both Temperature Variation and Axial Strain in Multi–coated Optical Fibers", *Journal of Optical Communications* (1998), vol. 19, No. 3, pp. 82–86.

King, et al, "Thermomechanical Mechanism for Delamination of Polymer Coatings from Optical Fibers", *Journal of Electronic Packaging* (Jun. 1997), vol. 119, pp. 133–137.

* cited by examiner

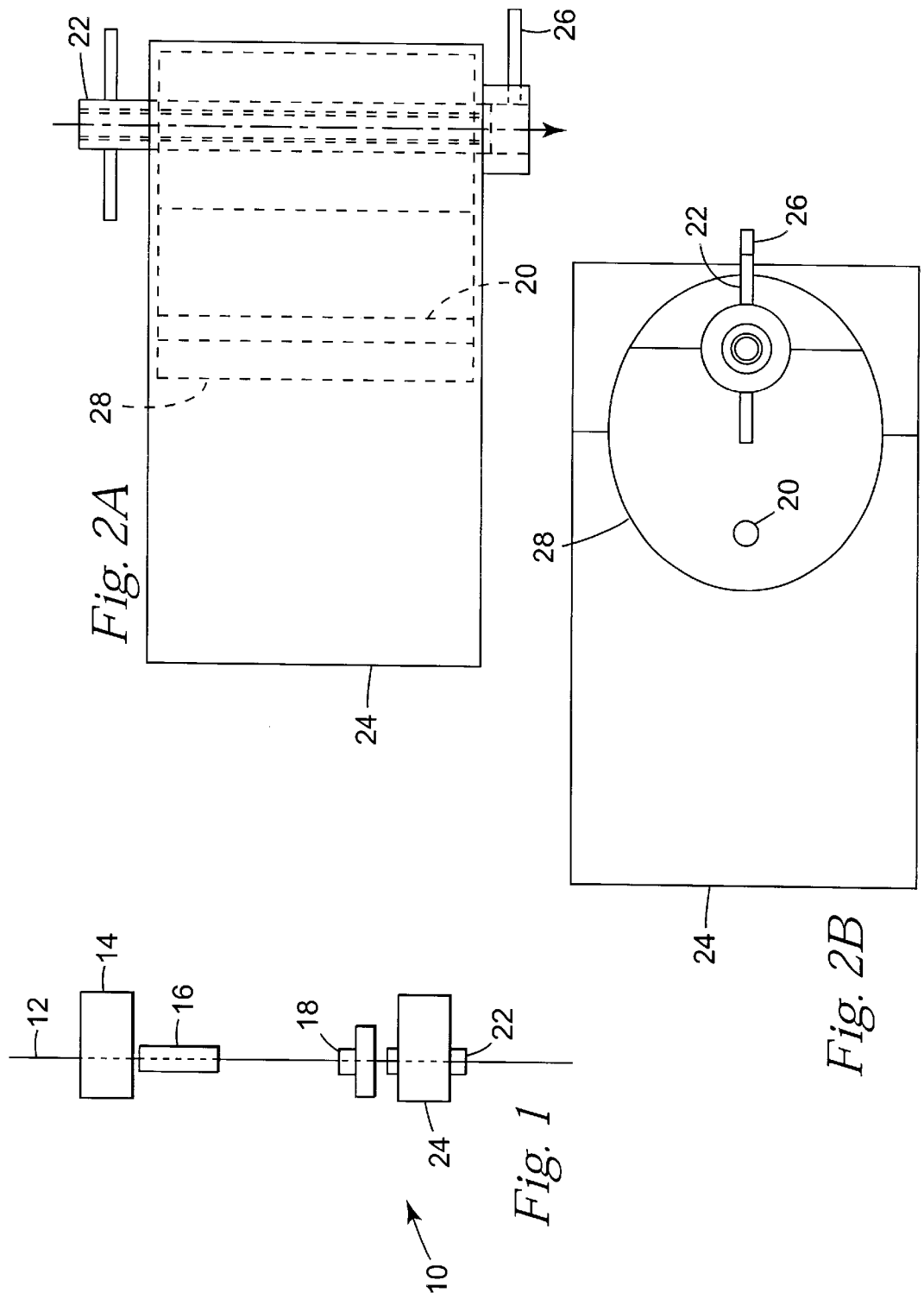

TEMPERATURE RANGE ADJUSTED COATED OPTICAL FIBERS

This is a continuation of application Ser. No. 09/780,983 filed Feb. 9, 2001.

STATEMENT AS TO FEDERALLY SPONSORED RESEARCH

This invention was made pursuant to DARPA Contract No. DAAH 01-95-C-R128. Accordingly, the federal government may have rights in this invention.

BACKGROUND OF THE INVENTION

This invention relates to manufacturing coated optical fibers.

Optical fibers typically are silica-based. To improve the moisture resistance and mechanical properties of the fiber, the fiber is often provided with multiple polymeric coatings disposed concentrically about the fiber, with the coating nearest the fiber being more flexible than the outermost coating(s).

To form the coatings, a photopolymerizable composition typically is applied to the fiber and polymerized by exposure to actinic radiation, e.g., ultraviolet radiation, to form a first polymer coating. Next, a second photopolymerizable composition is applied to the first polymer coating and likewise exposed to actinic radiation to form a second polymer coating.

One problem encountered with such coated fibers is that both polymerization processes generate heat. The heat generated during the second polymerization process can lead to the development of tensile stresses in the first polymer coating. These tensile stresses, in turn, can cause the first polymer coating to fracture, or delaminate, or both, thereby compromising the strength and moisture resistance of the fiber. In addition, in the case of telecommunications fibers and stress-sensitive fibers such as polarization maintaining (PM) and polarizing (PZ) fibers, these tensile stresses can manifest themselves as microbending losses or other effects on the optical signal, thereby degrading the overall performance of the fiber.

SUMMARY OF THE INVENTION

In a first aspect, the invention features a method for coating an optical fiber that includes: (a) applying a photopolymerizable composition to an optical fiber having a surface coated with a first polymer coating; and (b) exposing the photopolymerizable composition to a source of actinic radiation to form a second polymer coating under conditions which inhibit the production of thermally induced tensile stresses in the first polymer coating.

In preferred embodiments, the fiber is cooled prior to application of the photopolymerizable composition. Preferably, this is accomplished by exposing the fiber to a chilled stream of gas (e.g., an inert gas such as helium).

Inhibiting the production of thermally induced tensile stresses in the first polymer coating during exposure may be accomplished in several ways. For example, the fiber may be cooled with a chilled stream of gas such as helium during exposure. Another protocol involves providing the source of actinic radiation with a dichroic reflector that transmits infrared radiation generated by the radiation source away from the fiber. Yet another useful protocol includes placing a water-cooled jacket concentrically about the fiber. The surface of the jacket may be further provided with an infrared radiation-absorbing coating. In another embodiment, a tube (e.g., a quartz tube) having a surface coated with an infrared radiation-absorbing coating is disposed concentrically about the fiber.

Each of these protocols may be used alone, or in combination with any, or all, of the others.

The actinic radiation preferably is ultraviolet radiation. The first polymer coating preferably includes an acrylate-functional silicone polymer, while the photopolymerizable composition preferably includes a photopolymerizable acrylate-functional epoxy or acrylate-functional urethane composition.

In a second aspect, the invention features a method for coating an optical fiber featuring a surface coated with a first polymer coating where the fiber is essentially free of a hermetic carbon coating underlying the first polymer coating. The method includes (a) cooling the fiber (e.g., by exposing the fiber to a chilled stream of gas such as helium gas); (b) applying a photopolymerizable composition to the first polymer coating; and (c) exposing the photopolymerizable composition to a source of actinic radiation to form a second polymer coating. Preferably, the method further includes inhibiting the production of thermally induced tensile stresses during exposure according to the procedures described above.

The invention provides optical fibers having multiple polymer coatings in which the production of tensile stresses within an individual polymer coating is minimized. The fibers exhibit good moisture resistance and mechanical properties, and resist delamination. The ability to minimize tensile stresses, and thus the defects associated with such stresses, makes the fibers particularly useful in defect-sensitive applications such as interferometric fiber optic gyroscopes.

Other features and advantages of the invention will be apparent from the following description of the preferred embodiments thereof and from the claims.

BRIEF DESCRIPTION OF THE DRAWINGS

FIG. 1 is a schematic drawing of an apparatus for manufacturing coated optical fibers according to the invention.

FIG. 2a is an expanded schematic drawing of the apparatus shown in FIG. 1 illustrating the equipment used to polymerize the second photopolymerizable composition.

FIG. 2b is a top view of the equipment depicted in FIG. 2a.

DETAILED DESCRIPTION

Referring to FIGS. 1 and 2, there is shown an apparatus 10 for manufacturing a coated optical fiber having a plurality of polymer coatings disposed concentrically about the fiber core. As shown in FIG. 1, an optical fiber 12 provided with a first photopolymerizable coating disposed concentrically about the fiber core is exposed to actinic radiation (e.g., ultraviolet or visible radiation) from a lamp 14 to polymerize the coating. Examples of suitable materials for the first coating include relatively flexible polymers such as acrylate-functional silicone polymers. The particular type of actinic radiation and the exposure conditions are selected based upon the particular photopolymerizable coating employed.

Once polymerization is complete, the coated optical fiber may be cooled at a cooling station 16 by exposing the coated fiber to a chilled stream of gas. Preferably, the gas is inert with respect to the coated fiber. A number of gases can be used, including helium, nitrogen, argon, carbon dioxide, and combinations thereof. Because helium has a high thermal conductivity, it is particularly effective for cooling the coated fiber. The gas may be cooled, e.g., by running it through a coil of copper tubing submerged in a dry ice/propanol bath. Cooling the coated fiber prior to application of the second photopolymerizable coating is advantageous because it shrinks the dimensions of the coated fiber, thereby minimizing the production of tensile stresses following coating and polymerization of the second photopolymerizable coating.

Next, the cooled, coated fiber enters a coating station 18 where it is coated with a second photopolymerizable composition using conventional techniques such as die coating. The second photopolymerizable composition is designed to produce a second polymer coating concentrically disposed about the first polymer coating. The second polymer coating preferably is more rigid than the first polymer coating to provide mechanical reinforcement. Typical photopolymerizable compositions for preparing the second polymer coating include photopolymerizable acrylate or methacrylate-based compositions such as photopolymerizable acrylate-functional epoxy or urethane resins. Upon exposure to actinic radiation such as ultraviolet or visible radiation, the acrylate groups polymerize to form an acrylate polymer.

Following application of the second photopolymerizable composition, the fiber enters an enclosure 24 housing an actinic radiation source 20 and a water-jacketed quartz tube 22 designed to cool the fiber during actinic radiation exposure. These features are shown in greater detail in FIGS. 2(a) and 2(b).

As shown in FIGS. 2(a) and 2(b), enclosure 24 includes, as the actinic radiation source, an electrodeless ultraviolet lamp 20. Within enclosure 24, the fiber is exposed to ultraviolet radiation from lamp 20 as it moves through water-jacketed quartz tube 22. The particular exposure conditions are selected based upon the photopolymerizable composition. Upon exposure, the second photopolymerizable composition coated on the fiber polymerizes to form a second polymer coating.

Water circulating through the jacket absorbs heat and infrared radiation generated by the lamp during exposure, thereby preventing it from reaching the fiber. To enhance the heat absorption function, the outer surface of tube 22 may be further provided with an infrared-absorbing, ultraviolet-transmitting coating.

The fiber is further cooled during exposure by means of chilled helium gas supplied via a port 26. The helium may be cooled prior to contact with the fiber, e.g., by running it through a coil of copper tubing submerged in a dry ice/propanol bath.

A dichroic reflector 28 located within enclosure 24 and positioned around lamp 20 and tube 22 further assists inhibiting the formation of thermally induced tensile stresses in the first polymer coating during polymerization to form the second polymer coating. Reflector 28 reflects ultraviolet radiation generated in lamp 20 toward tube 22 but transmits infrared radiation away from tube 22, thereby reducing the amount of infrared radiation reaching the fiber.

The invention will now be described further by way of the following examples.

EXAMPLES

Comparative Example A

A freshly drawn silica fiber lacking a hermetic carbon coating was initially die-coated with a photopolymerizable, acrylate-functional, silicone composition (commercially available from Shin-Etsu under the designation "OF206") using a primary die size of 179 micrometers and a line speed of 1 m/sec. The composition was polymerized by exposing the coated fiber at a line speed of 1 m/sec to ultraviolet radiation supplied from a Fusion Systems I 256 irradiator with an F10-T housing equipped with an R350 reflector, a "D" bulb, and a VPS-6 variable power supply. The maximum output of the lamp (i.e., when the power level was set at 100%) was 375 watts/inch.

After formation of the first polymer coating, the fiber was die-coated with a second photopolymerizable composition using a primary die size of 199 micrometers. The composition was an acrylate-functional epoxy resin commercially available from DSM Desotech under the designation "3471-2-137." Following coating, the fiber was exposed to ultraviolet radiation using the above-described Fusion Systems equipment. The power supply was set at 80% power during exposure.

Following ultraviolet radiation exposure, approximately 2 meters of the resulting fiber were wrapped under low tension on a 2.5 inch diameter, 0.25 inch thick aluminum cylinder. The cylinder was then mounted horizontally in a temperature-controlled chamber and the free ends of the fiber were affixed to free hanging 25 gram weights. The resulting structure was then cycled between –55° C. and 70° C. for a total of 30 cycles, after which the fiber was examined microscopically for defects such as delaminations and fractures. Examination revealed a total of nine defects in the form of delaminations and fractures.

Example 1

The procedure of Comparative Example A was followed except that prior to application of the second photopolymerizable composition, the fiber was cooled by exposing it to a stream of chilled helium gas in a cooling unit measuring 10 in. long. The final product displayed no evidence of delamination or fracture.

Example 2

The procedure of Comparative Example A was followed except that a Fusion Systems dichroic reflector was positioned around the fiber and the ultraviolet lamp. The dichroic reflector reduced the amount of infrared radiation reaching the fiber during exposure. The final product displayed no evidence of delamination or fracture.

Example 3

The procedure of Comparative Example A was followed except that during exposure the fiber was cooled by exposing it to a stream of chilled helium gas. The final product displayed no evidence of delamination or fracture.

Example 4

The procedure of Comparative Example A was followed except that during exposure the fiber was cooled by encasing it in a water-cooled jacket. The final product displayed no evidence of delamination or fracture.

Example 5

The procedure of Comparative Example A was followed except that the exposure conditions were adjusted by reducing the power level setting to 60%. The final product displayed no evidence of delamination or fracture.

Example 6

The procedure of Comparative Example A was followed except that prior to application of the second photopolymerizable composition, the fiber was cooled by exposing it to a stream of chilled helium gas, as described in Example 1. In addition, a dichroic reflector was positioned around the fiber and the ultraviolet lamp to reduce the amount of infrared radiation reaching the fiber, as described in Example 2. Moreover, during exposure the fiber was cooled by encasing it in a water jacket, as described in Example 3, and exposing it to a stream of chilled helium gas, as described in Example 4. The exposure conditions were the same as described in Example 5. The final product displayed no evidence of delamination or fracture.

What is claimed is:

1. A temperature range adjusted coated optical fiber comprising:
    a) an optical fiber having an outer surface coated with a first polymer coating;
    b) a first interface between the optical fiber surface and the first polymer coating;
    c) a cured photopolymerizable second polymer coating in direct contact with and disposed concentrically about the first polymer coating; and
    d) a second interface between the first polymer coating and the second polymer coating;
    e) wherein, no delaminations at the first or second interfaces and no fractures within the first or second polymer coatings are observed by microscopic examination when an approximately two-meter long piece of the temperature range adjusted coated optical fiber, having two free ends,
        i) is wrapped under low tension on a 2.5 inch (6.4 cm) diameter aluminum tube having a wall thickness of 0.25 inches (0.64 cm), then
        ii) mounted with the tube horizontal and the free ends of the fiber are affixed to free-hanging 25 gram weights in a temperature-controlled chamber,
        iii) the chamber and tube being cycled approximately between −55° C. and 70°C. for a total of 30 cycles.

2. A temperature range adjusted, coated optical fiber comprising:
    a) an optical fiber;
    b) a first polymer coating comprising an aczylate-functional silicone composition generally concentrically surrounding the optical fiber; and
    c) a second polymer coating generally concentrically surrounding the first polymer coating;
    d) wherein the first polymer coating includes substantially no coefficient of thermal expansion stresses when the optical fiber is placed at a lower end of the temperature range.

3. The temperature range adjusted coated optical fiber of claim 2, wherein the optical fiber comprises silica.

4. The temperature range adjusted coated optical fiber of claim 2, wherein the fiber does not comprise a hermetic carbon coating.

5. The temperature range adjusted coated optical, fiber of claim 2, wherein the second polymer coating is a cured photopolymerizable second polymer coating selected from, the group consisting of an acrylate-based composition, a methacrylate-based composition, an acrylate-functional epoxy resin, and an acrylate-functional urethane composition and mixtures thereof.

6. The temperature range adjusted coated optical fiber of claim 5, wherein the cured photopolymerizable second polymer coating is cured at a temperature of approximately 0° C. or lower.

7. The temperature range adjusted coated optical fiber of claim 6, wherein the cured photopolymerizable second polymer coating is cured at a temperature of approximately −55° C. or lower.

8. The temperature range adjusted coated optical fiber of claim 2, wherein the optical fiber is a coated or partially coated bare silica-based fiber.

9. The temperature range adjusted coated optical fiber of claim 2, wherein the optical fiber is a polymeric fiber waveguide.

10. A fiber optic gyroscope comprising the temperature range adjusted coated optical fiber of claim 2.

11. The temperature range adjusted coated optical fiber of claim 2, wherein the zero-stress temperature of the first coating is approximately 0° C. or lower.

12. A sensor system comprising the temperature range adjusted coated optical fiber of claim 2.

13. The temperature range adjusted coated optical fiber of claim 2, wherein the zero-stress temperature of the first coating is approximately −55° C. or lower.

14. The temperature range adjusted coated optical fiber of claim 2, wherein the optical fiber is a polarization maintaining or polarizing fiber.

15. A communications system comprising the temperature range adjusted coated optical fiber of claim 2.

16. A guidance system comprising the temperature range adjusted coated optical fiber of claim 2.

* * * * *

UNITED STATES PATENT AND TRADEMARK OFFICE
CERTIFICATE OF CORRECTION

PATENT NO.    : 6,643,440 B2
DATED         : November 4, 2003
INVENTOR(S)   : Lynch, Thomas M.

It is certified that error appears in the above-identified patent and that said Letters Patent is hereby corrected as shown below:

Column 4,
Line 6, delete "I 256" and insert -- I256 --, therefor.

Column 5,
Line 41, delete "aczylate" and insert -- acrylate --, therefor.

Column 6,
Line 6, after "optical" delete ",".
Line 8, after "from" delete ",".

Signed and Sealed this

Sixth Day of July, 2004

JON W. DUDAS
*Acting Director of the United States Patent and Trademark Office*